(12) United States Patent
Achrai et al.

(10) Patent No.: US 11,309,568 B2
(45) Date of Patent: Apr. 19, 2022

(54) DIRECT AMMONIA ALKALINE MEMBRANE FUEL CELL AND METHOD OF OPERATING SAME

(71) Applicant: HYDROLITE LTD, Caesarea (IL)

(72) Inventors: Ben Achrai, Pardes Hanna (IL); Gal Tamir, Caesarea (IL); Miles Page, Hod Hasharon (IL); Shimshon Gottesfeld, Nishyuna, NY (US); Ervin Tal-Gutelmacher, Hod Hasharon (IL)

(73) Assignee: HYDROLITE LTD, Caesarea (IL)

( * ) Notice: Subject to any disclaimer, the term of this patent is extended or adjusted under 35 U.S.C. 154(b) by 0 days.

(21) Appl. No.: 17/263,908

(22) PCT Filed: Jul. 28, 2019

(86) PCT No.: PCT/IL2019/050850
§ 371 (c)(1),
(2) Date: Jan. 28, 2021

(87) PCT Pub. No.: WO2020/026231
PCT Pub. Date: Feb. 6, 2020

(65) Prior Publication Data
US 2021/0305613 A1    Sep. 30, 2021

(30) Foreign Application Priority Data

Jul. 30, 2018    (IL) .......................... 260880

(51) Int. Cl.
*H01M 8/22* (2006.01)
*H01M 8/04119* (2016.01)
(Continued)

(52) U.S. Cl.
CPC ......... *H01M 8/222* (2013.01); *H01M 4/9058* (2013.01); *H01M 8/04029* (2013.01);
(Continued)

(58) Field of Classification Search
CPC .............................. H01M 8/222; H01M 8/083
See application file for complete search history.

(56) References Cited

U.S. PATENT DOCUMENTS

2013/0052555 A1*  2/2013  Mizuhata .............. H01M 8/083
429/435

FOREIGN PATENT DOCUMENTS

EP          1843416         10/2007
JP       2010238369       * 10/2010
(Continued)

OTHER PUBLICATIONS

JP2010238369 English translation. Ogoshi et al. Japan. Oct. 21, 2010. (Year: 2010).*

(Continued)

*Primary Examiner* — Christopher P Domone
(74) *Attorney, Agent, or Firm* — Pearl Cohen Zedek Latzer Baratz LLP

(57) ABSTRACT

Disclosed is a method of operating an Alkaline Membrane Fuel Cell (AMFC) with direct ammonia feeding. The method may include providing AMFC comprising an anode inlet for receiving ammonia and a cathode inlet for receiving oxygen containing gas; operating the AMFC at an operation temperature of above 80° C.; providing the oxygen containing gas; to a cathode of the AMFC at a pressure above the equilibrium vapor pressure of water at the operation temperature; maintaining the pressure during the operation of the AMFC as to maintain water in substantially liquid phase near the cathode; and providing the ammonia to an anode of the AMFC.

9 Claims, 4 Drawing Sheets

(51) Int. Cl.
  *H01M 8/04701* (2016.01)
  *H01M 8/04746* (2016.01)
  *H01M 8/083* (2016.01)
  *H01M 8/1007* (2016.01)
  *H01M 8/1009* (2016.01)
  *H01M 8/04029* (2016.01)
  *H01M 4/90* (2006.01)

(52) U.S. Cl.
  CPC ... *H01M 8/04126* (2013.01); *H01M 8/04701* (2013.01); *H01M 8/04753* (2013.01); *H01M 8/083* (2013.01); *H01M 8/1007* (2016.02); *H01M 8/1009* (2013.01)

(56) References Cited

FOREIGN PATENT DOCUMENTS

| WO | WO 2010/133854 | 11/2010 |
| WO | WO 2017/163244 | 9/2017 |

OTHER PUBLICATIONS

Jason Ganley. "Intermediate-temperature direct ammonia fuel cell with a molten alkaline hydroxide electrolyte." Journal of Power Sources 178 (2008) 44-47. (Year: 2007).*
Lan et al. "Direct Ammonia Alkaline Anion-Exchange Membrane Fuel Cells." 2010 Electrochem. Solid-State Lett. 13 B83-B86. (Year: 2010).*
International Search Report of PCT Application No. PCT/IL2019/050850, dated Nov. 26, 2019.

* cited by examiner

DIRECT AMMONIA ALKALINE MEMBRANE FUEL CELL AND METHOD OF OPERATING SAME

CROSS-REFERENCE TO RELATED APPLICATIONS

This application is a National Phase Application of PCT International Application No. PCT/IL2019/50850, International Filing Date Jul. 28,2019, entitled: "DIRECT AMMONIA ALKALINE MEMBRANE FUEL CELL AND METHOD OF OPERATING SAME" published on Feb. 6, 2020 under PCT International Application Publication No. WO 2020/026231, claiming priority of Israel Patent Application No. 260880, filed Jul. 30,2018, which is hereby incorporated by reference.

TECHNICAL FIELD OF THE INVENTION

The invention is directed to the field of alkaline membrane fuel cell and more precisely to the field of alkaline membrane fuel cell operated by direct feeding of ammonia.

BACKGROUND OF THE INVENTION

Ammonia has a significantly higher volumetric energy density than compressed hydrogen, as it can be held as a liquid at room temperature under ~7 bar of pressure, whereas hydrogen can only be liquefied cryogenically, and is typically compressed to 200, 350 or 700 bar to achieve a desired energy density.

The complete ammonia oxidation reaction (AOR) to nitrogen and water is more challenging than the oxidation reaction of hydrogen, with requirements of breaking N—H bonds as well as forming N—N bonds, to achieve the desired, sustainable reaction forming $N_2$ and liberating 3 electrons per ammonia molecule according to, reaction I.

$$2NH_3 + 6OH^- \rightarrow 2N_2 + 6H_2O + 6e^- \qquad \text{I.}$$

This oxidation reaction is enabled by a suitable cathodic process, which in a fuel cell is typically an oxygen reduction cathode at which oxygen is reduced with consumption of water to generate OH— according to reaction II.

$$O_2 + 2H_2O + 4e^- \rightarrow 4OH^- \qquad \text{II.}$$

The overall oxidation-reduction reaction is according to reaction III:

$$4NH_3 + 3O_2 \rightarrow 2N_2 + 6H_2O \quad (\Delta E^0 \sim 1.17V) \qquad \text{III.}$$

Ammonia-based fuels have been limited to classes of fuel cells that are able to successfully oxidize ammonia, largely through the use of high cell temperatures to improve the performance of the AOR catalysis. Examples for fuel cells operated at elevated temperatures are Solid Oxide Fuel Cell (SOFC). These fuel cells can easily handle ammonia as a fuel, due to their operation under high temperature (typically above 600° C.), making them unsuitable for applications that require quick start-up and shut-down, such as when the fuel cell is the primary energy conversion device in automotive applications. SOFC has further low resilience under cycling due to thermal stresses in heating and cooling over hundreds of Kelvins between operation and shut-down states, and poor dynamic behavior.

Ammonia is also a potentially suitable fuel in Alkaline Fuel Cells (AFC). AFCs use a high concentration of metal hydroxide salt (e.g., 50 wt % KOH) as electrolyte for ion conduction between anode and cathode. In modern AFC's, this electrolyte is typically held within a "separator" similar to those used in alkaline batteries: The separator may include a porous support material that maintains good electrical insulation between anode and cathode in a very thin (10's to 100's of microns) porous layer, thus maximizing ion conductance. The electrolyte meanwhile fills the pores preventing exchange of gaseous reactants between anode and cathode.

AFCs are well suited to ammonia because the metal hydroxide electrolyte provides a strongly alkaline aqueous environment that improves the kinetics of the ammonia oxidation reaction (AOR). Furthermore, the AFC can operate at relatively high temperatures up to near the boiling point of the electrolyte. For example, a fuel cell operating at ~140° C. with a 60% KOH solution was reported.

Exchange membrane fuel cells have emerged as one of the most promising fuel cell technologies. The exchange solid membrane, replaces the electrolyte or electrolyte-soaked separator by providing ion conduction between the electrodes via solid-state polyelectrolyte materials, with conductivity imparted by water-solvated counterions. Exchange membrane fuel cells are commonly known as "PEM" fuel cells, where PEM is sometimes assumed to mean "polymer electrolyte membrane". More common usage today, employed from here on in, is "proton exchange membrane". Proton Exchange Membrane (PEM) fuel cells are very well-suited especially to mobile applications due to high performance (power density), excellent dynamic behavior, and no need for liquid electrolyte. Because of these and other features, PEM fuel cells are currently the technology of choice in the automotive industry.

However, ammonia cannot be used as a fuel in PEM fuel cells because aqueous ammonia in the acidic environment exists primarily as ammonium, $NH_4^+$, which displaces the $H^+$ ions that impart conductivity to the polyelectrolyte, and additionally are required to close the ionic part of the circuit, being generated in the anode and consumed in the cathode reactions.

Recently, anion exchange membranes (AEM) have emerged as a potential alternative to PEM for exchange membrane fuel cells. AEMs have cationic groups bound to the polymer and conduct via mobile anions. It has been postulated that ammonia could be a suitable fuel in alkaline membrane fuel cells (AMFC's).

However, currently available anion exchange membranes provide only moderate alkalinity, and the ammonia oxidation reaction rate is dependent on pH, with higher pH giving a faster reaction rate.

Furthermore, exchange membrane fuel cells are typically operated in a temperature range of about room temperature to 80° C., due to the need to keep the AEMs very well hydrated, as they are known to display a very strong loss of conductivity with loss in hydration.

Accordingly, AMFC based fuel cells operating with ammonia and without added electrolyte may have great benefits. However, in order to achieve sufficient AOR activity the AMFC needs to be redesigned to target operating temperatures well above 80° C., as has never been done before.

SUMMARY OF THE INVENTION

Some aspects of the invention may be directed to a method of operating an Alkaline Membrane Fuel Cell (AMFC) with direct ammonia feeding. In some embodiments, the method may include providing AMFC comprising an anode inlet for receiving ammonia and a cathode inlet for receiving oxygen containing gas; operating the AMFC at an operation temperature of above 80° C.; providing the oxygen containing gas; to a cathode of the AMFC at a pressure above the equilibrium vapor pressure of water at the operation temperature; maintaining the pressure during the operation of the AMFC as to maintain water in substantially liquid phase near the cathode; and providing the ammonia to an anode of the AMFC.

In some embodiments, the operation temperature may be above 100° C. In some embodiments, providing the ammonia may be in a gas phase at a pressure above the equilibrium vapor pressure of water at the operation temperature. In some embodiments, the method may further include providing the ammonia as an aqueous ammonia solution. In some embodiments, the method may further include adding humidity to the oxygen containing gas.

Some aspects of the invention may be directed to an Alkaline Membrane Fuel Cell (AMFC) with direct ammonia feed. In some embodiments, the AMFC may include: an anion conducting membrane; an anode electrode comprising an anode catalyst layer; a cathode electrode comprising a cathode catalyst layer; an ammonia source in fluid connection with the anode electrode; and an oxygen containing gas source in fluid connection to the cathode electrode. In some embodiments, the oxygen containing gas may provide at a pressure above the equilibrium vapor pressure of water at the operation temperature and the AMFC may be configured to operate at an operation temperature above 80° C.

In some embodiments, the oxygen containing gas is provided from a pressurized source as to maintain the pressure of the oxygen containing gas near the cathode at the pressure above the pressure of a boiling point of water at the operation temperature. In some embodiments, the oxygen containing gas source further comprises a humidifier for providing humidity to the oxygen containing gas.

In some embodiments, the ammonia source may be a pressurized ammonia source and the ammonia may be provided in a gas phase at a pressure above the equilibrium vapor pressure of water at the operation temperature. In some embodiments, the ammonia source may include a humidifier for providing humidity to the ammonia. In some embodiments, the ammonia source may include an aqueous solution of ammonia. In some embodiments, the operation temperature is above 100° C.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
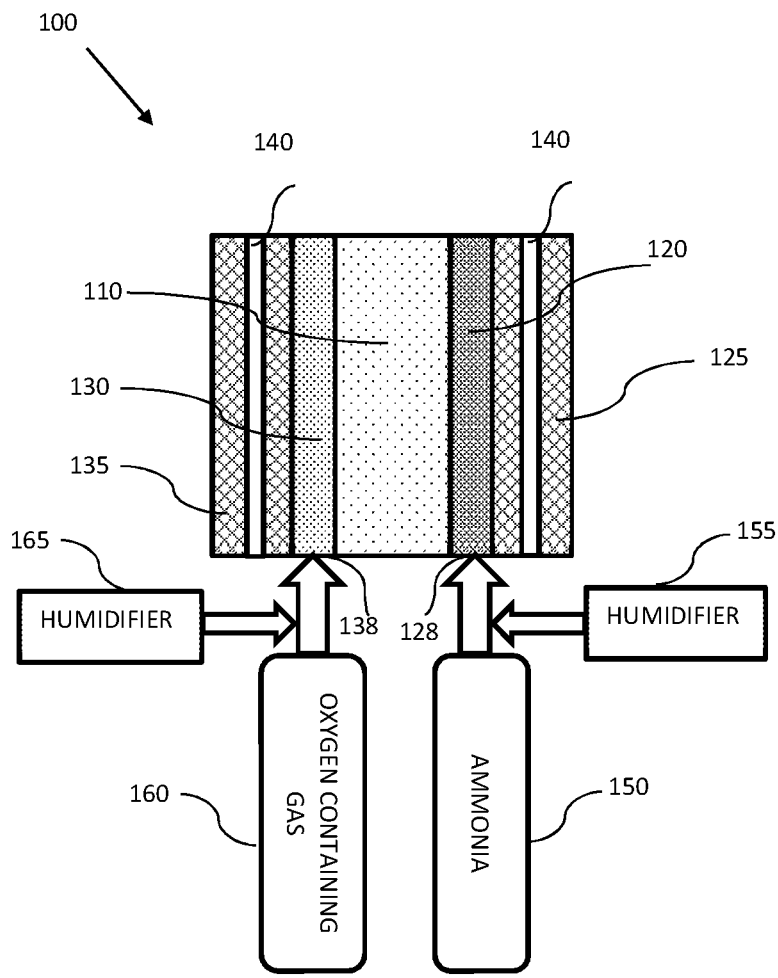
FIG. 1 is an illustration of an alkaline membrane fuel cell (AMFC) according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Some aspects of the invention may be directed to an AMFC operated with ammonia as a fuel with no addition of a liquid electrolyte, such as KOH solution. AMFCs may be operated with ammonia if including in addition to the solid electrolyte membrane also liquid electrolyte. However, operation of AMFC with ammonia as a fuel using only the solid electrolyte membrane (e.g., any solid electrolyte membrane known in the art), free from any aqueous electrolyte—neither in the membrane/separator, nor introduced by some external feed, is challenging and was never tried before. An only solid electrolyte membrane presents a higher energetic barrier to cross-over of ammonia from anode to the cathode, compared with the barrier set by a separator in a liquid electrolyte cell or a membrane that includes liquid electrolyte.

Added alkaline electrolyte such as KOH(aq) serves to increase conductivity in the catalyst layers, as well as increasing alkalinity of the environment which serves to increase the concentration and reactivity of the ammonia fuel.

To allow operation, the AMFC may be operated at temperatures higher than 80° C., for example, at 90° C., 95° C., 100° C., 105° C. or higher. In order to avoid dehydration of the watery environment required in both anode and membrane, to provide ion conductivity, and in the cathode to provide ion conductivity and sustain the ORR reaction, pressure may be applied to the fuel cell to prevent excessive gasification of the water. Furthermore, both the ammonia and a gas containing oxygen (e.g., pure oxygen, air, $O_2/N_2$ mixture and the like) may be provided with additional water or humidity. An ammonia gas and the gas containing oxygen may be humidified prior to entering the AMFC. Alternatively, the ammonia may be provided as an aqueous solution of ammonia.

Reference is now made to FIG. 1 which is an illustration of an AMFC with direct ammonia feed according to some embodiments of the invention. An AMFC 100 may include an anion conducting membrane 110 (e.g., with no additional liquid electrolyte), an anode electrode 120 having an anode catalyst layer, a cathode electrode 130 having a cathode catalyst layer an ammonia source 150 in fluid connection with the anode electrode and an oxygen containing gas source 160 in fluid connection to the cathode side. As used herein being in a fluid connection may include a connection that allow any flowing medium, such as gas, liquid, a binary phase flowing medium and the like, to flow from one place to the other. In some embodiments, the oxygen containing gas may be provided at a pressure above the pressure of a boiling point of an ammonia aqueous solution or water at the operation temperature.

In some embodiments, AMFC 100 may be operated at an operation temperature above 80° C. In some embodiments, heat produced in AMFC 100 may be extracted using cooling elements 140 (e.g., cooling water pipes). In some embodiments, cooling elements 140 may be controlled (e.g., by controlling the water capacity in the pipes) to extract less heat than commonly done in known AMFCs, such that the temperature in AMFC 100 may be kept above 80° C., for example, 85° C., 90° C., 95° C., 100° C., 110° C., 120° C. and above. In some embodiments, AMFC 100 may further include a heating element (not illustrated) for preheating AMFC 100 to above 80° C.

In some embodiments, anion conducting membrane 110 may include a solid ionomer configured to conduct anions such as: $OH^-$, $CO_3^{2-}$, $HCO_3^-$ and the like. Anion conducting membrane 110 may include any ionomer known in the art, for example, copolymers of diallyldimethylammonium chloride (DADMAC), copolymers of (Vinylbenzyl)trimethylammonium, other styrene-based polymers or copolymers having a quaternary ammonium, phosphonium or other anion-conducting group, poly(aryl)-based polymers with quaternary ammonium, phosphonium or other such cationic functional groups either incorporated in the polymer backbone or attached via tethering groups to the polymer backbone.

In some embodiments, anion conducting membrane 110 may be the only electrolyte required in the operation of AMFC 100 with ammonia as a fuel.

In some embodiments, anion conducting membrane 110 may further be crosslinked. In some embodiments, the crosslinking agent may be any crosslinking agent known in the art. For example, the crosslinking agent for crosslinking anion conducting ionomer 110 may be, Divinylbenzne, N,N,N',N'-Tetramethyl-1,6-hexanediamine (TMHDA) or other linear tertiary diamines, 1,4-diazabicyclo[2.2.2]octane (DABCO), glyoxal, glutarhaldehyde, and other crosslinkers known in the art.

Such crosslinkers can generally be used in cooperation with ionomers or ionomer precursors configured to allow reaction with such crosslinkers. For example, an ionomer of one of the general types described above could contain some alkene tether groups, alkyl halide groups, hydrocarbon chains, sulfur groups, siloxy groups, N-hydroxybenzotriazole groups, azide groups and the like and the like, which are available for reactive coupling with the crosslinker(s).

As should be understood by one skilled in the art, the crosslinking agent may be selected according to the type of the ionomer to be crosslinked. In some embodiments, anion conducting membrane 110 may be supported by a porous, inert (ie, stable and non-ion conducting) substrate or mesh such as expanded poly(tetrafluoroethylene), polypropylene, polyethylene, poly(ethylene tetrafluoroethylene), poly(vinyl chloride) and the like.

In some embodiments, anode electrode 120 having an anode catalyst layer may include an anion conducting ionomer and nanoparticles that promote AOR (e.g., any ammonia oxidation catalyst that may be known or discovered in the art). Such ammonia oxidation catalysts may include, for example, nanoparticles of Pt, Ir and/or Pt/Ir alloys, or alloys of copper and/or nickel optionally coupled with other platinum-group-metals. In some embodiments, the ammonia oxidation catalyst may include additional co-catalyst materials, for example, metal oxide particles, such as rare earth oxides such as lanthanum oxide or yttrium oxide; europium oxide, manganese oxide, iron oxide, cobalt oxide, nickel oxide; or metal particles such as palladium, ruthenium, rhodium, rhenium, copper, nickel, platinum, iridium, molybdenum and the like.

In some embodiments, the ammonia oxidation catalyst nanoparticles may be supported on or mixed with high surface carbon or other electrically conducting nanoparticles.

In some embodiments, cathode electrode 130 having a cathode catalyst layer may include an anion conducting ionomer and nanoparticles that promotes oxygen reduction reaction (ORR) (e.g., any oxygen reduction catalysts that may be known or discovered in the art). Such oxygen reduction catalyst may include, for example, nanoparticles of Ag, Pd, Pt or their alloys, various metal oxides such as cobalt, manganese and the like, carbons doped with heteroatom such as the above or iron, nitrogen and the like. In some embodiments, the oxygen reduction catalyst nanoparticles may be supported on or mixed with high surface area carbons, or other electrically conducting nanoparticles.

In some embodiments, anode electrode 120 may include a gas diffusion layer 125 to form a gas diffusion anode electrode. In some embodiments, cathode electrode 130 may include a gas diffusion layer 135 to form a gas diffusion cathode electrode. In some embodiments, gas diffusion layers 125 and/or 135 may include a porous mat of carbon fibers, carbon cloth or other conductive material. In some embodiments, gas diffusion layers 125 and/or 135 may include a micro-porous layer (MPL) and may contain a portion of with wet-proofing material such as Teflon® or similar, placed against anode 120 and cathode 130 catalyst layers.

In some embodiments, ammonia source 150 may be in fluid connection with anode electrode 120. Ammonia source 150 may include at least one of: ammonia gas and an ammonia aqueous solution. In some embodiments, when the ammonia is provided in a gas phase ammonia source 150 may include a humidifier 155 for providing humidity to the ammonia, for example, in a humidity of 0-100% RH, in some cases super-humidification (RH>100%) may be introduced. In some embodiments, humidifier 155 may be an independent water inlet line, water recirculation system, or any other suitable device. In some embodiments, when the ammonia is provided as the ammonia aqueous solution, the ammonia to water ratio may be between 1 (100% liquid or gaseous ammonia) to 0.001 (almost 100% water). For example, the concentration of ammonia at the ammonia reservoir 150 may be at least 0.1 M, for example, 1 M, 10 M or 16 M aqueous ammonia.

In some embodiments, the ammonia either as gas or solution may be provided to AMFC 100 via an anode inlet 128.

In some embodiments, the concentration of ammonia in the aqueous solution may be chosen according to operation temperature of AMFC 100. The higher the operation temperature, the lower is the ammonia content in water, and the greater proportion of the overall feed is in the vapor phase at the inlet.

In some embodiments, when the ammonia is provided as gas (either humidified or not), ammonia source 150 may include a pressurized source (e.g., a pressurized tank, a compressor or pump, and the like).

In some embodiments, oxygen containing gas source 160 may be in fluid connection to the cathode electrode. Oxygen containing gas source 160 may be configured to provide, pure oxygen, air, $N_2/O_2$ mixture or any other gas mixture that contains oxygen. In some embodiments, the oxygen containing gas may be provided from a pressurized source (e.g., a pressurized tank, a compressor or pump and the like) to maintain the pressure of the oxygen containing gas near the cathode above the equilibrium vapor pressure of water at the operating temperature.

In some embodiments, oxygen containing gas source 160 may provide the oxygen containing gas at a pressure above 1.1 bar, for example, 1.5 bar, 2-5 bar or more. For example, if the operation temperature is 100° C. the oxygen containing gas may be provided at a pressure of about 1.02 bars or higher, to maintain a liquid watery environment near cathode 130.

Figure 2:
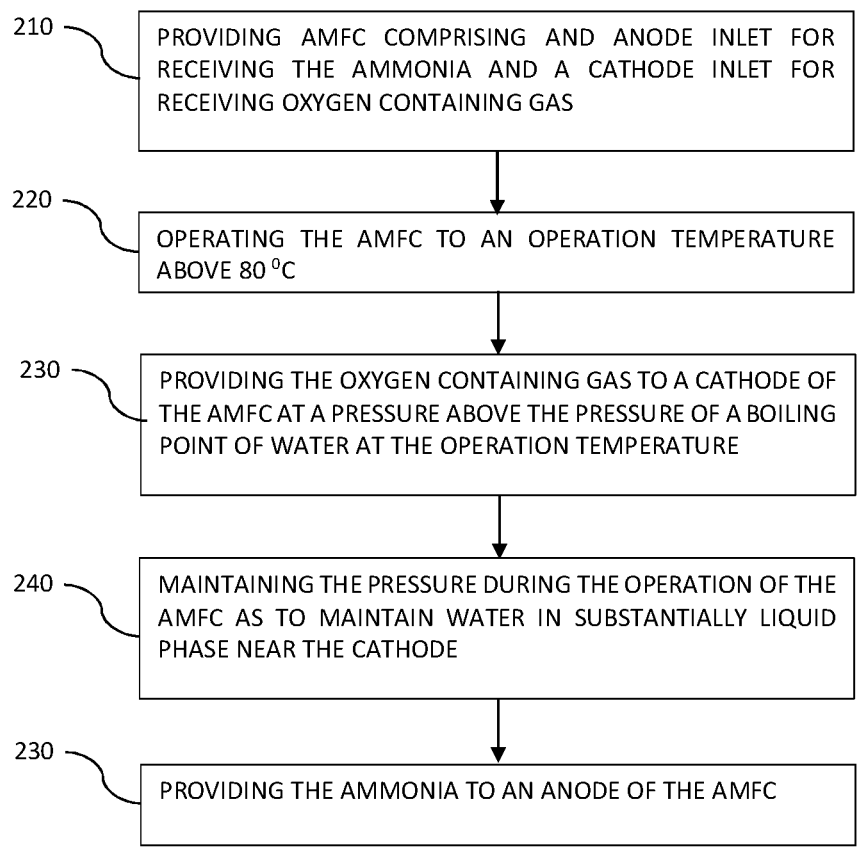
FIG. 2 is a flowchart of a method of operating an AMFC according to some embodiments of the invention.

Reference is now made to FIG. 2, which is a flowchart of a method of operating an AMFC with direct ammonia feeding according to some embodiments of the invention. In box 210, an AMFC that includes an anode inlet for receiving ammonia and a cathode inlet for receiving oxygen containing gas may be provided. For example, AMFC 100 that includes anode inlet 128 and cathode inlet 138 may be provided. In box 220, the AMFC may be operated at an operation temperature of above 80° C. For example, cooling unit 140 may extract at least some of the heat produced during the operation of AMFC 100, such that the operation temperature may be maintained at above 80° C., 85° C., 90° C., 95° C., 100° C., 105° C., 110° C., 120° C. or more.

In box 230, the oxygen containing gas may be provided to a cathode of the AMFC at a pressure above the pressure of a boiling point of water or an aqueous solution of ammonia at the operation temperature. For example, air may be provided to cathode 130 at a pressure of 1.02 bars or higher, when the operation temperature is 100° C. In some embodiments, the oxygen containing gas may be provided at a pressure above 1.1 bars. In some embodiments, humidity may be provided to the oxygen containing gas, for example, using humidifier 165.

In box 240, the pressure may be maintained during the operation of the AMFC as to maintain water near the cathode at a liquid phase. For example, air may be provided to cathode 130 at a pressure of 2 bars when the operation temperature is 100° C. to maintain the water near cathode 130 at a liquid phase even at 100° C.

In box 250, the ammonia may be provided to an anode of the AMFC. In some embodiments, the ammonia may be provided at a pressure above the equilibrium vapor pressure of water at the operation temperature. In some embodiments, the ammonia may be provided as an aqueous ammonia solution. In some embodiments, humidity may be provided to the ammonia when the ammonia is provided in a gas phase, for example, using humidifier 155.

Figure 3:
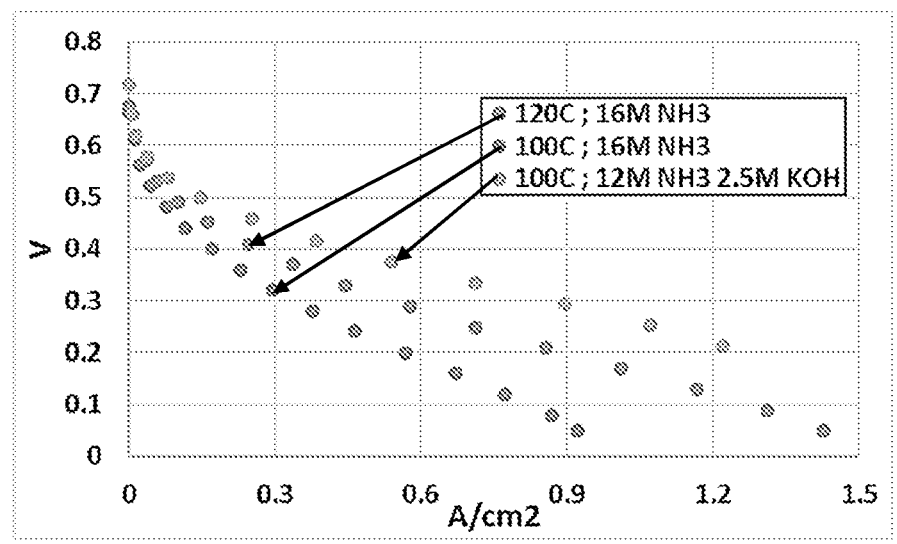
FIG. 3 shows I-V (polarization) curves of an AMFC according to embodiments of the invention operated with 16 M $NH_3$ solution at different temperatures, in comparison to an AMFC operated with KOH-containing ammonia solution.

Reference is now made to FIG. 3 which shows I-V (polarization) curves of an AMFC according to embodiments of the invention operated with 16 M $NH_3$ solution at different temperatures, in comparison to an AMFC operated with KOH-containing ammonia solution. As can be seen operating the AMFC at temperatures 120 and 100° C. at a pressure of 2 bar gave almost the same I-V curves as the AMFC operated with KOH-containing ammonia solution. The higher the temperature the better the performance.

Figure 4:
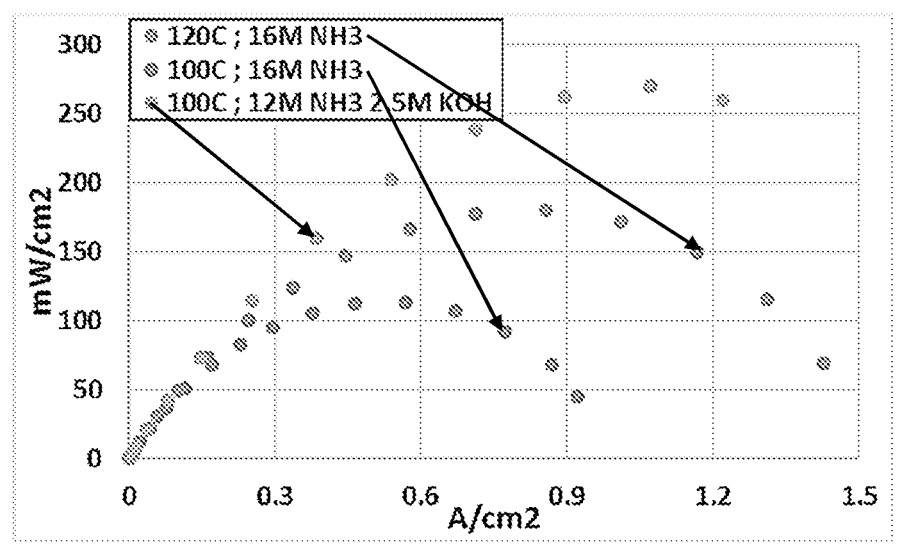
FIG. 4 shows power density ($mW/cm^2$) vs. current density ($A/cm^2$) plots of an AMFC according to embodiments of the invention operated with 16 M $NH_3$ solution at different temperatures, in comparison to an AMFC operated with KOH-containing ammonia solution.

Reference is now made to FIG. 4. shows power density (mW/cm$^2$) vs. current density (A/cm$^2$) plots of an AMFC according to embodiments of the invention operated with 16 M $NH_3$ solution at different temperatures, in comparison to an AMFC operated with KOH-containing ammonia solution. The same as for the I-V curves, operating the AMFC at temperatures 120 and 100° C. at a pressure of 2 bar gave almost the same power density (mW/cm$^2$) vs. current density (A/cm$^2$) plots as the AMFC operated with KOH-containing ammonia solution. The higher the temperature the better the performance.

Figure 5:
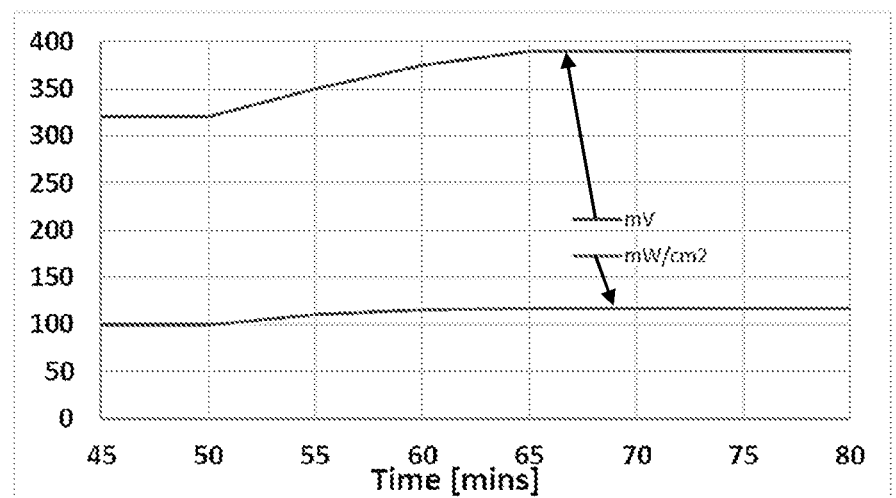
FIG. 5 shows stability plots of an AMFC according to embodiments of the invention operated with 16 M $NH_3$ solution at 120° C., discharged at 0.3 $A/cm^2$.

Reference is now made to FIG. 5, which shows stability plots for an AMFC according to embodiments of the invention operated with 16 M $NH_3$ solution at 120° C., discharged at 0.3 A/cm$^2$. As can be seen the voltage and the surface power density were stable the entire working time of the fuel cell.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of operating an Alkaline Membrane Fuel Cell (AMFC) with direct ammonia feeding, the method comprising:
    providing AMFC comprising: a solid electrolyte membrane free of aqueous electrolyte, an anode inlet for receiving ammonia and a cathode inlet for receiving oxygen containing gas;
    operating the AMFC at an operation temperature of above 95° C.;
    providing the oxygen containing gas to a cathode of the AMFC at a pressure above the equilibrium vapor pressure of water at the operation temperature; and
    providing the ammonia to an anode of the AMFC by providing one of:
        ammonia in a gas phase at a pressure above the equilibrium vapor pressure of water at the operation temperature;
        ammonia as an aqueous ammonia solution; and
        ammonia in a gas phase while adding humidity to the oxygen containing gas.

2. The method of claim 1, wherein the operation temperature is above 100° C.

3. An Alkaline Membrane Fuel Cell (AMFC) with direct ammonia feed, comprising:
    a solid electrolyte anion conducting membrane free of aqueous electrolyte;
    an anode electrode comprising an anode catalyst layer;
    a cathode electrode comprising a cathode catalyst layer;
        an ammonia source in fluid connection with the anode electrode:
    an oxygen containing gas source in fluid connection to the cathode electrode,
    wherein the oxygen containing gas is provided at a pressure above the equilibrium vapor pressure of water at the operation temperature; and
    a cooling element controlled to maintained the temperature in the AMFC above 95° C.

4. The Alkaline Membrane Fuel Cell of claim 3, wherein the oxygen containing gas is provided from a pressurized source.

5. Alkaline Membrane Fuel Cell of claim 3, wherein the oxygen containing gas source further comprises a humidifier for providing humidity to the oxygen containing gas.

6. Alkaline Membrane Fuel Cell of claim 3, wherein the ammonia source is a pressurized ammonia source and the ammonia is provided in a gas phase at a pressure above the equilibrium vapor pressure of water at the operation temperature.

7. The Alkaline Membrane Fuel Cell of claim 6, wherein the ammonia source comprises a humidifier for providing humidity to the ammonia.

8. Alkaline Membrane Fuel Cell of claim 3, wherein the ammonia source comprises an aqueous solution of ammonia.

9. Alkaline Membrane Fuel Cell of claim 3, wherein the operation temperature is above 100° C.

* * * * *